(12) United States Patent
Kohnotoh et al.

(10) Patent No.: US 8,058,748 B2
(45) Date of Patent: Nov. 15, 2011

(54) POWER SUPPLY CONVERTER/S WITH CONTROLLER/S RESPONSIVE TO VOLTAGE, CURRENT, AND POWER

(75) Inventors: Masaaki Kohnotoh, Kyoto (JP); Tomonori Kunimitsu, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 275 days.

(21) Appl. No.: 12/411,764

(22) Filed: Mar. 26, 2009

(65) Prior Publication Data
US 2009/0184581 A1 Jul. 23, 2009

Related U.S. Application Data

(62) Division of application No. 10/931,992, filed on Sep. 2, 2004, now Pat. No. 7,522,435.

(30) Foreign Application Priority Data

Sep. 5, 2003 (JP) .................................. 2003-313422
Mar. 26, 2004 (JP) .................................. 2004-090798

(51) Int. Cl.
*H02J 1/10* (2006.01)
(52) U.S. Cl. ........................................ 307/43
(58) Field of Classification Search .......... 307/43, 307/52; 327/100; 323/266–270
See application file for complete search history.

(56) References Cited

U.S. PATENT DOCUMENTS

| 5,451,750 | A | * | 9/1995 | An .................................. 219/716 |
| 5,838,145 | A | * | 11/1998 | Poon et al. .................... 323/266 |
| 5,852,555 | A | | 12/1998 | Martin |
| 6,005,373 | A | * | 12/1999 | Snodgrass et al. ............ 323/266 |
| 6,707,285 | B2 | | 3/2004 | Telefus et al. |
| 7,085,116 | B2 | * | 8/2006 | Kudo et al. ................... 361/93.6 |

FOREIGN PATENT DOCUMENTS

| JP | 409107675 A | * | 4/1997 |
| JP | 2833460 | | 10/1998 |

OTHER PUBLICATIONS

"Parallel Drive Control of DC-DC Converters" The Institute of Electronics, Information and Communication Engineers, issued Nov. 1992, IEICE Technical Report, PE92-47, pp. 23-29.

* cited by examiner

*Primary Examiner* — Albert W Paladini
(74) *Attorney, Agent, or Firm* — McDermott Will & Emery LLP

(57) ABSTRACT

Each of power supply units in a power supply system according to the present invention includes a power supply module, a voltage increase/decrease circuit for increasing the voltage across the power supply module and outputting the increased voltage to a load, and a control circuit. The control circuit calculates the power of the power supply module on the basis of the voltage across the power supply module and current flowing in the power supply module, outputs the power calculation result to a control circuit of another power supply unit, and generates and outputs a control signal to the voltage increase/decrease circuit on the basis of a target output voltage of the voltage increase/decrease circuit, the power calculation result, and a power calculation result obtained from a control circuit of a third power supply unit.

10 Claims, 9 Drawing Sheets

POWER SUPPLY CONVERTER/S WITH CONTROLLER/S RESPONSIVE TO VOLTAGE, CURRENT, AND POWER

RELATED APPLICATIONS

This application is a Divisional of U.S. application Ser. No. 10/931,992, filed Sep. 2, 2004 now U.S. Pat. No. 7,522,435, claiming priority of Japanese Application Nos. 2003-313422, filed Sep. 5, 2003 and 2004-090798, filed Mar. 26, 2004, the entire contents of each of which are hereby incorporated by reference.

BACKGROUND OF TEE INVENTION

1. Field of the Invention

The present invention relates to a power supply unit and a power supply system having a secondary cell or the like to/from which power can be input/output. More particularly, the present invention relates to a power supply unit and a power supply system realizing efficient parallel driving of secondary cells or the like.

2. Description of the Prior Art

Hitherto, as a power supply to/from which power can be input/output, a secondary cell (storage battery) and a capacitor are used. As secondary cells, there are known a battery pack in which a plurality of secondary cells are connected in series with one another and a battery pack in which a plurality of secondary cells are connected in parallel with each other. There is also generally known a method of increasing electric energy which can be continuously output by connecting a plurality of capacitors in parallel with one another.

In a power supply system constructed by connecting a plurality of converters in parallel, there are known a method of calculating an average value of output currents of the plurality of converters and adjusting output current of each of the converters to the calculated average output current and a method of detecting the maximum output current from output currents of the plurality of converters and adjusting output current of each of the converters to the detected maximum output current. Such methods are disclosed in, for example, Japanese Patent No. 2833460 and "Parallel Drive Control of DC-DC Converters" (The Institute of Electronics, Information and Communication Engineers, issued in November, 1992, IEICE Technical Report, PE92-47, pp. 23-29).

On the other hand, in recent years, a fuel cell using hydrogen as a material is being actively developed. FIG. 9 is a diagram showing output characteristics of a fuel cell. A solid line 300 indicates an output characteristic of a fuel cell in the case where the horizontal axis denotes output current and the vertical axis indicates output voltage. As shown by the solid line 300, the fuel cell has the characteristic that as the output of current increases, the output voltage decreases. As understood from a solid line 301 indicating the output characteristic of the fuel cell in the case where the horizontal axis denotes output current and the vertical axis indicates output power, as the output current increases from 0 ampere, the output power of the fuel cell increases. The output power becomes the maximum at current Ij. When the output current is increased more than the current Ij, the output power decreases. When the current exceeding the current Ij is output, the fuel cell may be destroyed, so that it is necessary to control to always use the fuel cell at the current Ij or less.

For example, in the case of using, as a power supply, a battery pack in which "k" ("k": an integer of 2 or more) secondary cells are connected in parallel with one another, as compared with the case of using a single secondary cell as a power supply, ideally, constant power can be continuously supplied to a load for time which is long by "k" times (that is, the life of the power supply increases by "k" times).

In the battery pack in which "k" secondary cells are connected in parallel with one another, however, even if the capacities of the "k" secondary cells are the same, current flowing in the secondary cells varies due to variations in the internal resistance of the secondary cells. As a result, the powers generated at both ends (both poles) of the secondary cell (the product between voltage across the ends (both poles) of the secondary cell and current flowing in the secondary cell) also varies. Consequently, the time points at which the residual quantities of the secondary cells become zero and the time points at which the secondary cells are fully charged are different from one another. Therefore, actually, it does not mean that by using the battery pack, the life of the power supply increases by "k" times (actually, the life increases less than "k" times).

This phenomenon similarly occurs also in the case of using capacitors in place of secondary cells. Further, there is another problem in that a secondary cell having low internal resistance is over-discharged or over-charged and the characteristics of the secondary cell deteriorate.

Also in the case where a power supply is constructed by connecting "k" fuel cells in parallel with one another, current flowing in the fuel cells varies due to variations of output impedances of the fuel cells. In this case, current is output preferentially from a fuel cell having low output impedance, so that the output current of the fuel cell having low output impedance exceeds the current Ij (FIG. 9) and a problem occurs such that the fuel cell is destroyed.

SUMMARY OF THE INVENTION

In view of the above circumstances, an object of the present invention is to provide a power supply system capable of adjusting powers obtained from power supply modules of a plurality of power supply units connected in parallel with one another, and a power supply unit used for the power supply system.

First Power Supply System: W Balance

In order to achieve the object, a first power supply system according to the present invention includes a pair of connection terminals to which a load is to be connected, and includes a plurality of power supply units connected in parallel with one another with respect to the pair of connection terminals, and each of the power supply units has a power supply module capable of outputting power. Each of the power supply units includes: a voltage detection circuit for detecting a voltage across the power supply module of the power supply unit itself; a current detection circuit for detecting current flowing in the power supply module of the power supply unit itself; a voltage adjustment circuit for increasing the voltage across the power supply module of the power supply unit itself and outputting the increased voltage to the pair of connection terminals; and a control circuit for controlling operation of the voltage adjustment circuit. Control circuits of all of the power supply units being connected to each other or in an annular shape. In each of the power supply units, the control circuit includes: a power calculation portion for calculating the magnitude of a power generated across the power supply module in the power supply unit on the basis of a result of detection of the voltage detection circuit in the power supply unit and a result of detection of the current detection circuit in the power supply unit; an output portion for outputting a power calculation result of the power calculation portion to a control circuit connected; and a control portion for generating a control signal on the basis of a target output voltage of the voltage adjustment circuit in the power supply unit, a power calculation result of the power calculation portion in the power supply unit, and a power calculation result obtained from the control circuit connected or another control circuit connected, and for outputting the control signal to the voltage adjustment circuit in the power supply unit.

In the control circuit of each of the power supply units of the first power supply system, "in the power supply unit" denotes "in the power supply unit that incorporates the control circuit".

In the first power supply system, "power generated across the power supply module" denotes power output from the power supply module.

The first power supply system according to the present invention is constructed by connecting two power supply units in parallel with one another with respect to the pair of connection terminals, and the control circuits of the two power supply units are connected to each other. Alternatively, the first power supply system according to the present invention is constructed by connecting three or more power supply units in parallel with one another with respect to the pair of connection terminals. The control circuits of all of the power supply units are connected in an annular shape by, for example, connecting each of the control circuits to other two control circuits.

In each of three or more power supply units connected in parallel of the power supply system, the voltage across the power supply module is detected by the voltage detection circuit, and current flowing in the power supply module is detected by the current detection circuit. By the power calculation portion of the control circuit, a detection result of the voltage detection circuit and a detection result of the current detection circuit are multiplied with each other, thereby calculating the magnitude of power obtained from the power supply module. The power calculation result is output to one of two control circuits connected to each other by the output portion.

By the control portion, the control signal is generated on the basis of the target output voltage of the voltage adjustment circuit, the power calculation result, and the power calculation result obtained from another control circuit connected. For example, a control signal for making the output voltage of the voltage adjustment circuit follow the target output voltage and setting the difference between the two power calculation results to zero is generated. The generated control signal is supplied to the voltage adjustment circuit, the voltage across the power supply module is increased at an increase ratio according to the control signal by the voltage adjustment circuit, and the increased voltage is output to the pair of connection terminals.

In such a manner, the control of making the voltage to be output to the pair of connection terminals follow the target output voltage is performed, thereby setting the voltage to be output to the pair of connection terminals to the target output voltage, and the control for making the power obtained from the power supply module coincide with the power obtained from the power supply module of the other power supply unit connected is executed, thereby equalizing the powers obtained from the power supply modules in the two power supply units connected to each other.

In the first power supply system according to the present invention, as described above, by making the powers obtained from the power supply modules of two power supply units connected to each other coincide with each other, the powers obtained from the power supply modules of all of the power supply units can be equalized. Therefore, in the case where the power supply module is constructed by a secondary cell (storage battery) or a capacitor, if the capacities of all of the power supply modules are the same, the residual capacities of all of the power supply modules become zero at the same time point, and a power supply module having relatively low internal resistance and a power supply module having relatively high output voltage can be prevented from being over-discharged. In the case where the power supply module is constructed by a fuel cell, even if the output impedances of fuel cells are various, all output powers of the power supply modules are equalized. Thus, the risk of destruction of the fuel cell is extremely reduced.

The first power supply system according to the present invention can be used as a source for supplying power to various loads having different rated voltages by changing the target output voltage.

The first power supply system according to the present invention can be also used as a source of supplying power to various loads having different power consumption by increasing/decreasing the number of power supply units.

Second Power Supply System: I Balance

A second power supply system according to the present invention includes a pair of connection terminals to which a load is to be connected, and includes a plurality of power supply units connected in parallel with one another with respect to the pair of connection terminals, and each of the power supply units has a power supply module capable of outputting power. Each of the power supply units comprises: a current detection circuit for detecting current flowing in the power supply module of the power supply unit itself; a voltage adjustment circuit for increasing the voltage across the power supply module of the power supply unit itself and outputting the increased voltage to the pair of connection terminals; and a control circuit for controlling operation of the voltage adjustment circuit. The control circuits of all of the power supply units are connected to each other or in an annular shape. In each power supply unit, the control circuit includes: an output portion for outputting a current detection result of the current detection circuit in the power supply unit to a connected control circuit; and a control portion for generating a control signal on the basis of a target output voltage of the voltage adjustment circuit in the power supply unit, the current detection result of the current detection circuit in the power supply unit, and a current detection result obtained from the control circuit connected or another control circuit connected, and for outputting the control signal to the voltage adjustment circuit in the power supply unit.

In the control circuit of each of the power supply units of the second power supply system, "in the power supply unit" denotes "in the power supply unit that incorporates the control circuit".

The second power supply system according to the present invention is constructed by connecting two power supply units in parallel with one another with respect to the pair of connection terminals, and the control circuits of the two power supply units are connected to each other. Alternatively, the second power supply system according to the present invention is constructed by connecting three or more power supply units in parallel with one another with respect to the pair of connection terminals. The control circuits of all of the power supply units are connected in an annular shape by, for example, connecting each of the control circuits to other two control circuits.

In each of three or more power supply units connected in parallel of the power supply system, the current flowing in the power supply module is detected by the current detection circuit and, by the output portion of the control circuit, the current detection result is output to one of the two control circuits connected.

By the control portion, the control signal is generated on the basis of the target output voltage of the voltage adjustment circuit, the current detection result, and the current detection result obtained from the other control circuit connected. For example, a control signal for making the output voltage of the voltage adjustment circuit follow the target output voltage and setting the difference between the two current detection results to zero is generated. The generated control signal is supplied to the voltage adjustment circuit, the voltage across the power supply module is increased at an increase ratio according to the control signal by the voltage adjustment circuit, and the increased voltage is output to the pair of connection terminals.

In such a manner, the control of making the voltage to be output to the pair of connection terminals follow the target output voltage is performed, thereby setting the voltage to be output to the pair of connection terminals to the target output voltage, and the control for making the current flowing in the power supply module coincide with the current flowing in the power supply module of the other power supply unit connected is executed, thereby equalizing the currents flowing in the power supply modules in the two power supply units connected to each other.

In the second power supply system according to the present invention, as described above, by making the currents flowing in the power supply modules of two power supply units connected to each other coincide with each other, the currents flowing in the power supply modules of all of the power supply units can be equalized. Therefore, in the case where variations of the output voltages of the plurality of the power supply modules are small, the powers obtained from the power supply modules become almost equal to each other. On assumption that variations of the output voltages are small, in the where the power supply module is constructed by a secondary cell (storage battery) or a capacitor, if the capacities of all of the power supply modules are the same, the residual capacities of all of the power supply modules become zero at the same time point, and a power supply module having relatively low internal resistance and a power supply module having relatively high output voltage can be prevented from being over-discharged. In the case where the power supply module is constructed by a fuel cell, even if the output impedances of fuel cells are various, output powers of the power supply modules are equalized. Thus, the risk of destruction of the fuel cell is extremely reduced.

The second power supply system according to the present invention can be used as a source for supplying power to various loads having different rated voltages by changing the target output voltage.

Further, the second power supply system according to the present invention can be also used as a source of supplying power to various loads having different power consumption by increasing/decreasing the number of power supply units.

Concrete Configuration

In a concrete configuration, each of the power supply modules can also receive power. In each power supply unit, the voltage adjustment circuit decreases the voltage between the pair of connection terminals and outputs the decreased voltage to the both ends (both poles) of the power supply module in the same power supply unit.

In the control circuit of each power supply unit of the concrete configuration, "in the same power supply unit" denotes "in the power supply unit that incorporates the voltage adjustment circuit".

In the first power supply system having the concrete configuration, "power generated across the power supply module" denotes power output from the power supply module in the case where the power supply module outputs power (at the time of discharging) and denotes power input to the power supply module in the case where the power supply module receives power (at the time of regenerate charging).

In each of the power supply units of the power supply system having the concrete configuration, at the time of regenerate charging at which power is supplied from a load to the power supply module, by the voltage adjustment circuit, the voltage between the pair of connection terminals is decreased at a decrease ratio according to the control signal from the control circuit and the decreased voltage is output across the power supply module.

In the power supply system having the concrete configuration, at the time of regenerate charging, the control of making the power to be supplied to the power supply module coincide with the power to be supplied to the power supply module of one of the power supply units connected is performed, thereby equalizing the powers supplied to the power supply modules between the two power supply units connected to each other. Thus, the powers supplied to the power supply modules of all of the power supply units are equalized. If the residual capacities of all of the power supply modules are the same, all of the power supply modules are fully charged at the same time point, and a power supply module having relatively low internal resistance and a power supply module having relatively high output voltage can be prevented from being over-charged.

In a concrete configuration, each of the power supply units has a pair of power input/output terminals connected to the pair of connection terminals. The voltage adjustment circuit includes: an inductor provided for one of two serial lines extending from both ends of a power supply module to the pair of power input/output terminals; a switching element for charging provided on a power input/output terminal side of the inductor of the one serial line and having a rectifier for setting a current direction at the time of discharging of the power supply module to a forward direction; and a switching element for discharging provided for parallel lines for connecting the two serial lines to each other between the inductor and the switching element for charging and having a rectifier for setting the current direction at the time of charging the power supply module to a forward direction. The control portion of the control circuit generates a control signal for the switching element for charging and a control signal for the switching element for discharging.

In each of the power supply units of the power supply system having the concrete configuration, at the time of discharging when power is supplied from the power supply module to a load, in a state where the switching element for discharge is on and the switching element for charging is off, energy is accumulated in the inductor by the voltage across the power supply module. After that, when the switching element for discharging is switched to the off state and the switching element for charging is switched to the on state, the energy accumulated in the inductor is supplied to the load via the conductive electrodes of the switching element for charging and via the rectifier. In such a manner, the voltage increasing operation of increasing the voltage across the power supply module and outputting the increased voltage to the pair of connection terminals is executed.

On the other hand, at the time of regenerate charging when power is supplied from the load to the power supply module, in a state where the switching element for charging is on and the switching element for discharging is off, energy generated in the load is supplied to the power supply module via the inductor. After that, when the switching element for charging is switched to the off state and the switching element for discharging is switched to the on state, current is passed via the conductive electrodes of the switching element for discharging and via the rectifier, and the energy accumulated in the inductor is cancelled. In such a manner, the voltage decreasing operation of decreasing the voltage between the pair of connection terminals and outputting the decreased voltage across the power supply module is executed.

In the power supply system having the concrete configuration, the power supply unit can be made smaller as compared with the configuration where a voltage increase circuit and a voltage decrease circuit are provided.

Further, in the concrete configuration, a charging power supply for supplying power to the power supply modules of the plurality of power supply units can be connected to the pair of connection terminals. Each of the power supply units has a charging control portion for generating and outputting a control signal to a voltage adjustment circuit in the power supply unit itself on the basis of target input current of the power supply module in the power supply unit itself and a detection result of the current detection circuit in the power supply unit itself when the charging power supply is connected to the pair of connection terminals.

In each of the power supply units of the power supply system having the concrete configuration, at the time of normal charging when power is supplied from the charging power supply to the power supply module, a control signal for making the current flowing in the power supply module follow the target input current is generated by the charge control circuit, thereby controlling the current flowing in the power supply module. Therefore, a conventional charger having the charge control circuit is unnecessary.

In another concrete configuration, a charging power supply for supplying power to the power supply modules of the plurality of power supply units can be connected to the pair of connection terminals. The control circuit of each power supply unit has a charge control portion for generating and outputting a control signal to the voltage adjustment circuit in the power supply unit on the basis of the target input current of the power supply module in the power supply unit and the detection result of the current detection circuit in the power supply unit when the charging power supply is connected to the pair of connection terminals.

In each of the power supply units of the power supply system having the concrete configuration, at the time of normal charging when power is supplied from the charging power supply to the power supply module, a control signal for making the current flowing in the power supply module follow the target input current is generated by the control circuit, thereby controlling the current flowing in the power supply module. Therefore, a conventional charger having the charge control circuit is unnecessary. As compared with the configuration where a control circuit for performing discharging control and a control circuit for performing charging control are provided, the power supply unit can be made smaller.

For example, the power supply module is constructed by a storage battery, a capacitor, or a fuel cell. More concretely, the power supply module from which power can be output is constructed by a storage battery, a capacitor, or a fuel cell. A power supply module to/from which power can be input/output is constructed by n storage battery or a capacitor.

DETAILED DESCRIPTION OF PREFERRED EMBODIMENTS

First Embodiment

Cell

Figure 1:
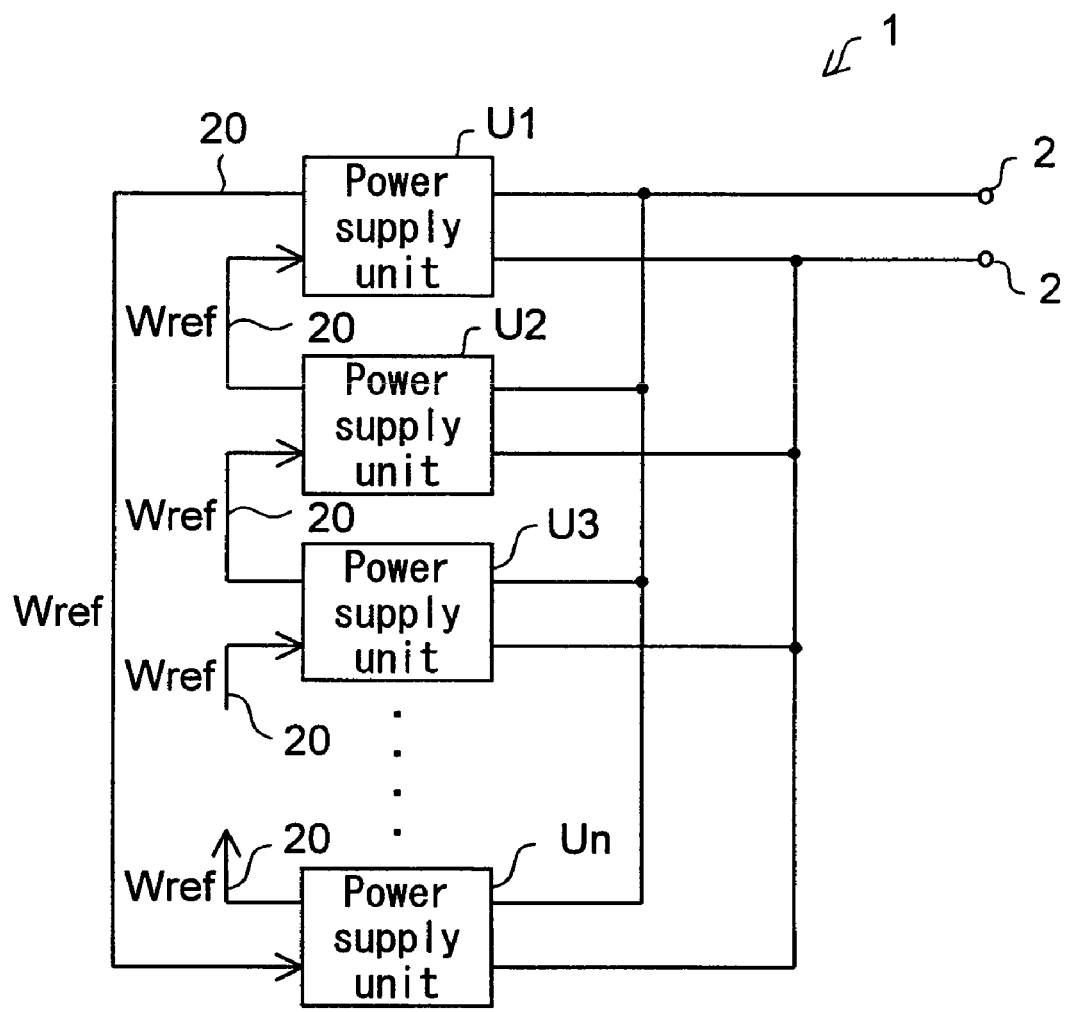
FIG. 1 is a diagram showing an electric configuration of a power supply unit and a power supply system according to a first embodiment of the present invention.

A first embodiment of a power supply unit and a power supply system having the power supply unit according to the present invention will be described below with reference to the drawings. FIG. 1 is a diagram showing an electric configuration of the power supply unit and the power supply system according to the present invention.

FIG. 1: Power Supply System

As shown in FIG. 1, a power supply system 1 of the embodiment is constructed by "n" (n: an integer of 3 or more) power supply units U1, U2, U3, . . . , and Un connected in parallel with one another, and a pair of connection terminals 2, 2 to which a load (not shown) such as a motor and a charging power supply (not shown) for supplying power to the power supply units U1 to Un are to be connected. To the pair of connection terminals 2, 2, "n" power supply units U1 to Un are connected in parallel with one another.

Neighboring two power supply units (power supply units U1 and U2, U2 and U3, . . . , and Un−1 and Un) are connected to each other via a control signal line 20, and the power supply units U1 and Un at both ends of the parallel arrangement are connected to each other via the control signal line 20, thereby connecting all of the power supply units U1 to Un in an annular shape.

Each of all of the power supply units U1 to Un has one power supply module (not shown in FIG. 1). To one of the pair of power supply units, from the other power supply unit connected via the control signal line 20, a calculation result of power generated across the power supply module of the one power supply unit is supplied as a power instruction Wref to adjust so that the power generated across the power supply module of the one power supply unit coincides with the power instruction Wref.

In the embodiment, to the power supply unit U1, a result of calculation of power generated at both ends of the power supply module of the power supply unit U2 is given as the power instruction Wref from the power supply unit U2. To the power supply unit U2, a result of calculation of power generated at both ends of the power supply module of the power supply unit U3 is given as the power instruction Wref from the power supply unit U3. In such a manner, the powers generated across the power supply modules are adjusted between two neighboring power supply units and between the power supply units U1 and Un at both ends, thereby making the powers of all of the power supply modules uniform.

Figure 2:
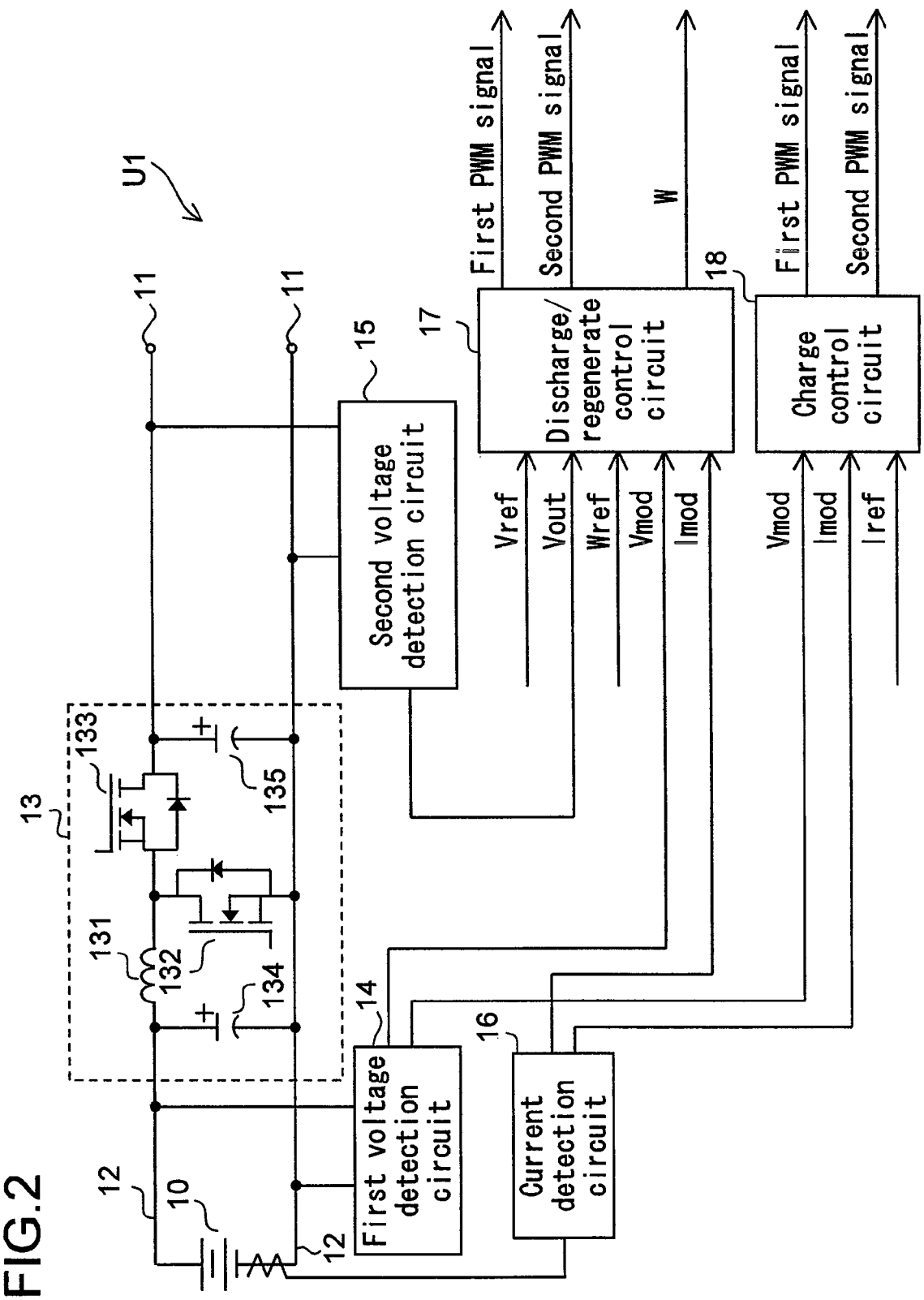
FIG. 2 is a diagram showing an electric configuration of the power supply unit in FIG. 1.

FIG. 2: Description of Configuration

FIG. 2 shows the configuration of the power supply unit U1. Since the configuration of the power supply units U2 to Un other than the power supply unit U1 is similar to that of the power supply unit U1, its illustration and description are omitted. The power supply unit U1 has a pair of input/output terminals 11, 11 connected to the pair of connection terminals 2, 2 (FIG. 1). The power supply module 10 is constructed by either a single secondary cell (storage battery) or a plurality of secondary cells connected in series with one another. The pair of input/output terminals ii, ii are terminals to/from (intended to mean "to or from") which power is input/output (intended to mean "input or output"), so that they can be also called power input/output terminals.

For simplicity of description, it is assumed that all of the power supply modules 10 are charged so as to be able to output the same power. Specifically, when the power supply modules 10 start outputting the same power simultaneously, the residual quantities of all of the power supply modules 10 become zero at the same time (the power supply modules 10 simultaneously become unable to output the power).

Two serial lines 12, 12 extend from both ends of the power supply module 10 (or "both electrodes" there of, since the power supply module 10 is constructed by a secondary cell) toward the pair of input/output terminals 11, 11. For the serial lines 12, 12, a voltage increase/decrease circuit 13 is provided.

The voltage increase/decrease circuit 13 increases the voltage across the power supply module 10 at the time of discharge when power is supplied from the power supply module 10 to a load and outputs the increased voltage to the pair of input/output terminals 11, 11. On the other hand, the voltage increase/decrease circuit 13 decreases the voltage between the pair of input/output terminals 11, 11 and outputs the decreased voltage across the power supply module 10 at the time of regenerative charging when the power is supplied from the load to the power supply module 10 and at the time of normal charging when power is supplied from a power supply for charging to the power supply module 10.

For one of the two serial lines 12, 12 (the positive voltage side of the power supply module 10), a coil 131 as an inductor and a switching element 133 for charging constructed by an MOSFET (metal oxide semiconductor field effect transistor) and a diode having an anode on the power supply module 10 side thereof are provided. For parallel lines for connecting the two serial lines 12, 12 on the power supply module 10 side of the coil 131, a first capacitor 134 is provided. For parallel lines for connecting the two serial lines 12, 12 between the coil 131 and the switching element 133 for charging, a switching element 132 for discharging which is constructed by an MOSFET and a diode having a cathode on the coil 131 side thereof are provided. Further, for parallel lines for connecting the two serial lines 12, 12 on the side of the pair of input/output terminals 11, 11 of the switching element 133 for charging, a second capacitor 135 is provided.

At the time of discharging, in a state where the MOSFET of the switching element 132 for discharge is on and the MOSFET of the switching element 133 for charging is off, energy is accumulated in the coil 131 by the voltage across the power supply module 10. After that, when the MOSFET of the switching element 132 for discharging is switched to the off state and the MOSFET of the switching element 133 for charging is switched to the on state, the energy accumulated in the coil 131 is supplied via the source-drain of the MOSFET and the diode as a rectifier that are provided in the switching element 133 for charging to the second capacitor 135 and the load (not shown) connected to the input/output terminals 11, 11. In such a manner, the voltage increasing operation is executed.

On the other hand, at the time of regenerate charging and normal charging, in a state where the MOSFET of the switching element 133 for charging is on and the MOSFET of the switching element 132 for discharging is off, energy generated in the load or the energy of the power supply for charging is supplied to the power supply module 10 via the coil 131 and charging is performed. After that, when the MOSFET of the switching element 133 for charging is switched to the off state and the MOSFET of the switching element 132 for discharging is switched to the on state, current is passed via the first capacitor 134 and via the source-drain of the MOSFET and the diode as a rectifier that are provided in the switching element 132 for discharging, and the energy accumulated in the coil 131 is cancelled. In such a manner, the voltage decreasing operation is executed.

The voltage increase/decrease circuit 13 constructed by the coil 131, the switching element 132 for discharging, the switching element 133 for charging, the first capacitor 134, and the second capacitor 135 are example of a voltage adjustment circuit having the function of increasing the voltage across the power supply module 10 and outputting the increased voltage to the pair of input/output terminals 11, 11 or decreasing the voltage across the pair of input/output terminals 11, 11 and outputting the decreased voltage across the power supply module 10.

To the two serial lines 12, 12, a first voltage detection circuit 14 for detecting a voltage across the power supply module 10 (which is identical with the module voltage Vmod described later) and also a second voltage detection circuit 15 for detecting an output voltage of the voltage increase/decrease circuit 13 are connected. Further, to the two serial lines 12, 12, a current detection circuit 16 for detecting a current in the power supply module 10 (which is identical with the module current Imod described later) is connected.

The module voltage Vmod detected by the first voltage detection circuit 14, the output voltage Vout detected by the second voltage detection circuit 15, and the module current Imod detected by the current detection circuit 16 are input to a discharge/regenerate control circuit 17 built with a microcomputer. The discharge/regenerate control circuit 17 calculates power generated across the power supply module 10 on the basis of the module voltage Vmod which is a result of detection of the first voltage detection circuit 14 and the module current Imod which is a result of detection of the current detection circuit 16 at the time of discharging and regenerate charging, and outputs the power calculation result W to the power supply unit Un as the other power supply unit connected by the control signal line 20. The "power generated across the power supply module 10" denotes power output from the power supply module 10 at the time of discharging and denotes power input to the power supply module 10 at the time of regenerate charging.

To the discharge/regenerate control circuit 17, the voltage instruction Vref indicative of a target output voltage of the voltage increase/decrease circuit 13 is input from the outside and the power calculation result is input as the power instruction Wref from the power supply unit U2 as the other power supply unit connected via the control signal line 20.

The discharge/regenerate control circuit 17 compares the output voltage Vout with the voltage instruction Vref supplied as described, compares the power calculation result W with the power instruction Wref in the own unit and, on the basis of the result of these comparisons, generates a first PWM signal to the switching element 132 for discharging of the voltage increase/decrease circuit 13 and a second PWM signal to the switching element 133 for charging of the voltage increase/decrease circuit 13. The first and second PWM signals generated in such a manner are supplied respectively to the switching element 132 for discharging and the switching element 133 for charging, thereby controlling on/off states of the switching elements 132 and 133.

As described above, the control is performed to make the output voltage Vout of the voltage increase/decrease circuit 13 follow the target output voltage Vref and to set the output voltage Vout of the voltage increase/decrease circuit 13 to the target output voltage Vref. And also the control is performed to make the power generated across the power supply module 10 coincide with the power generated across the power supply module of the power supply unit U2 as one of the power supply units connected. Thereby adjusting the powers generated across the power supply modules of the two power supply units U1 and U2 connected to each other via the control signal line 20. As described above, since all of the power supply units U1 to Un are connected in an annular shape, the powers generated across the power supply modules of the all of the power supply units U1 to Un are made coincide with each other.

The module voltage Vmod detected by the first voltage detection circuit 14 and the module current Imod detected by the current detection circuit 16 are input to a charge control circuit 18 built with a microcomputer. To the charge control circuit 18, a charge current instruction Iref indicative of target input current is input from the outside.

At the time of normal charging, the charge control circuit 18 compares the module current Imod with the charge current instruction Iref and, on the basis of the result of comparison, generates the first PWM signal for the switching element 132 for discharging of the voltage increase/decrease circuit 13 and the second PWM signal for the switching element 133 for charging of the voltage increase/decrease circuit 13. The first and second PWM signals generated as described above are supplied respectively to the switching element 132 for discharging and the switching element 133 for charging, and the switching elements 132 and 133 are on/off controlled. In such a manner, the control of making the module current Imod flowing in the power supply module 10 follow the charge current instruction Iref is performed so that the module current Imod is set to the target input current Iref. That is, the charge control circuit 18 has the function of a charge control portion for generating the control signals (first and second PWM signals), and outputting the control signals to the voltage increase/decrease circuit 13 at the time of normal charging.

The charge control circuit 18 detects the full charge state of the power supply module 10, on the basis of the module voltage Vmod supplied as described above, and at the time point of detecting the full charge state, stops supply of the PWM signals to the switching element 132 for discharging and the switching element 133 for charging. As a result, supply of power from the power supply for charging to the power supply module 10 is stopped.

Figure 3:
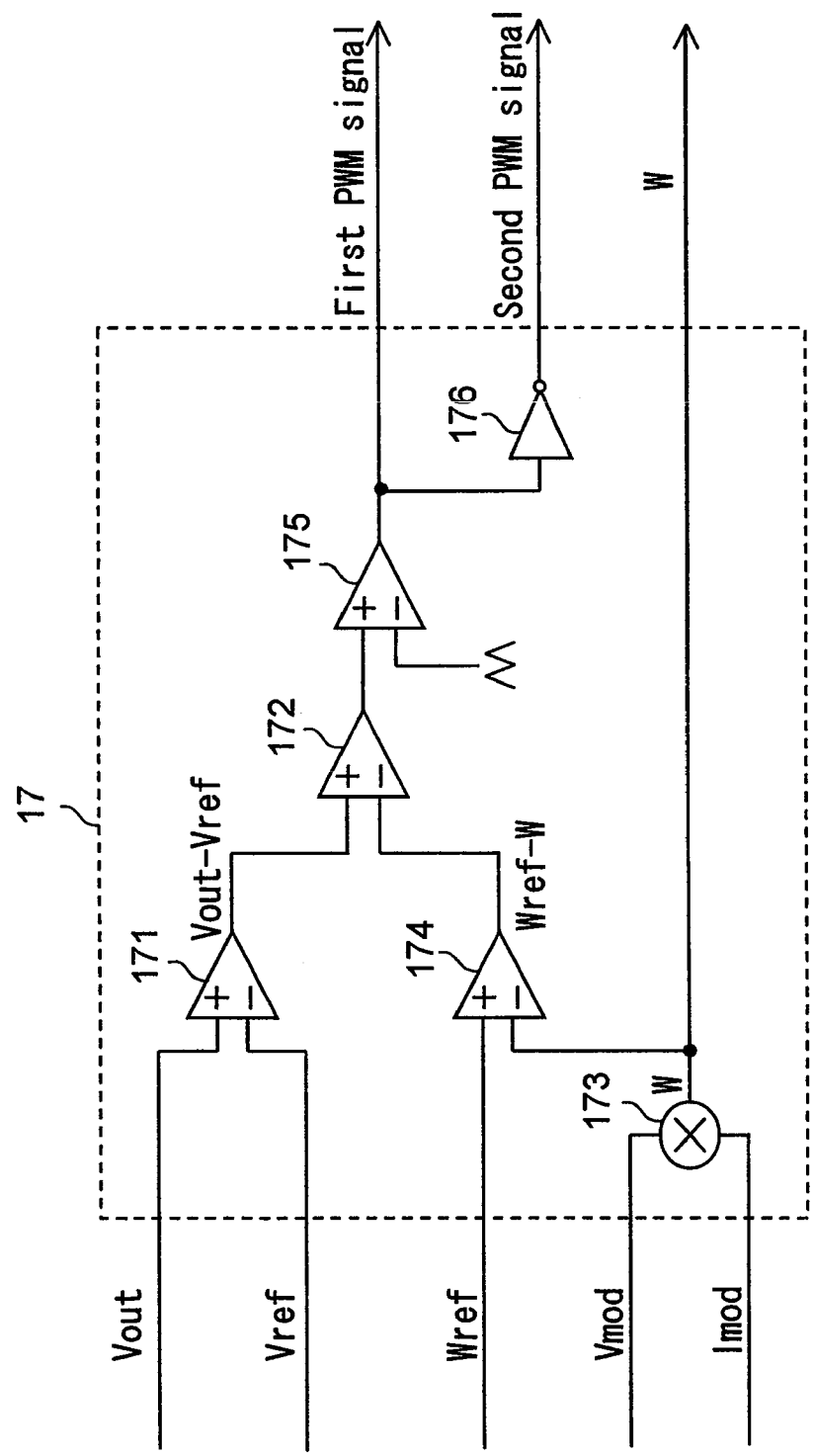
FIG. 3 is a diagram showing an electric configuration of a discharge/regenerate control circuit in FIG. 2.

FIG. 3: Details of Discharge/Regenerate Control Circuit

FIG. 3 shows the detailed electric configuration of the discharge/regenerate control circuit 17 in FIG. 2. As described above, the output voltage Vout, detected by the second voltage detection circuit 15 and the voltage instruction Vref from the outside are supplied to a voltage control circuit 171. In the voltage control circuit 171, the voltage instruction Vref is subtracted from the output voltage Vout, thereby generating a voltage error signal. The voltage error signal (Vout–Vref) is supplied to an error amplification circuit 172.

The module voltage Vmod, detected by the first voltage detection circuit 14, and the module current Imod, detected by the current detection circuit 16, are supplied to a power calculation circuit 173. The power calculation circuit 173 multiplies the module voltage Vmod with the module current Imod to calculate the power generated across the power supply module 10. Then, the power calculation circuit 173 supplies the power calculation result W to a power control circuit 174, and to one of the power supply units (in FIG. 1, the power supply unit Un) connected via the control signal line 20.

The power instruction Wref is supplied from the other power supply unit (in FIG. 1, the power supply unit U2) connected to the power control circuit 174. The power calculation result W is subtracted from the power instruction Wref, thereby generating a power error signal. The power error signal (Wref–W) is supplied to the error amplification circuit 172.

In the error amplification circuit 172, the power error signal (Wref–W) is subtracted from the supplied voltage error signal (Vout–Vref), thereby generating an error amplification signal. The error amplification signal is supplied to a PWM (pulse Width Modulation) control circuit 175. The PWM control circuit 175 subtracts a predetermined delta wave signal from the error amplification signal, thereby generating the first PWM signal, and outputs the first PWM signal to the switching element 132 for discharging of the voltage increase/decrease circuit 13 shown in FIG. 2. The first PWM signal is supplied to an inverter circuit 176. The inverter circuit 176 inverts the polarity of the first PWM signal to generate the second PWM signal and outputs the second PWM signal to the switching element 133 for charging.

As described above, the discharge/regenerate control circuit 17 has the function of a control portion for generating and outputting the first and second PWM signals, as control signals, to the voltage increase/decrease circuit 13 on the basis of the output voltage Vout, the voltage instruction Vref indicative of the target output voltage of the voltage increase/decrease circuit 13, the power calculation result W of the power calculation circuit 173, and the power instruction Wref obtained from the outside.

Figure 4:
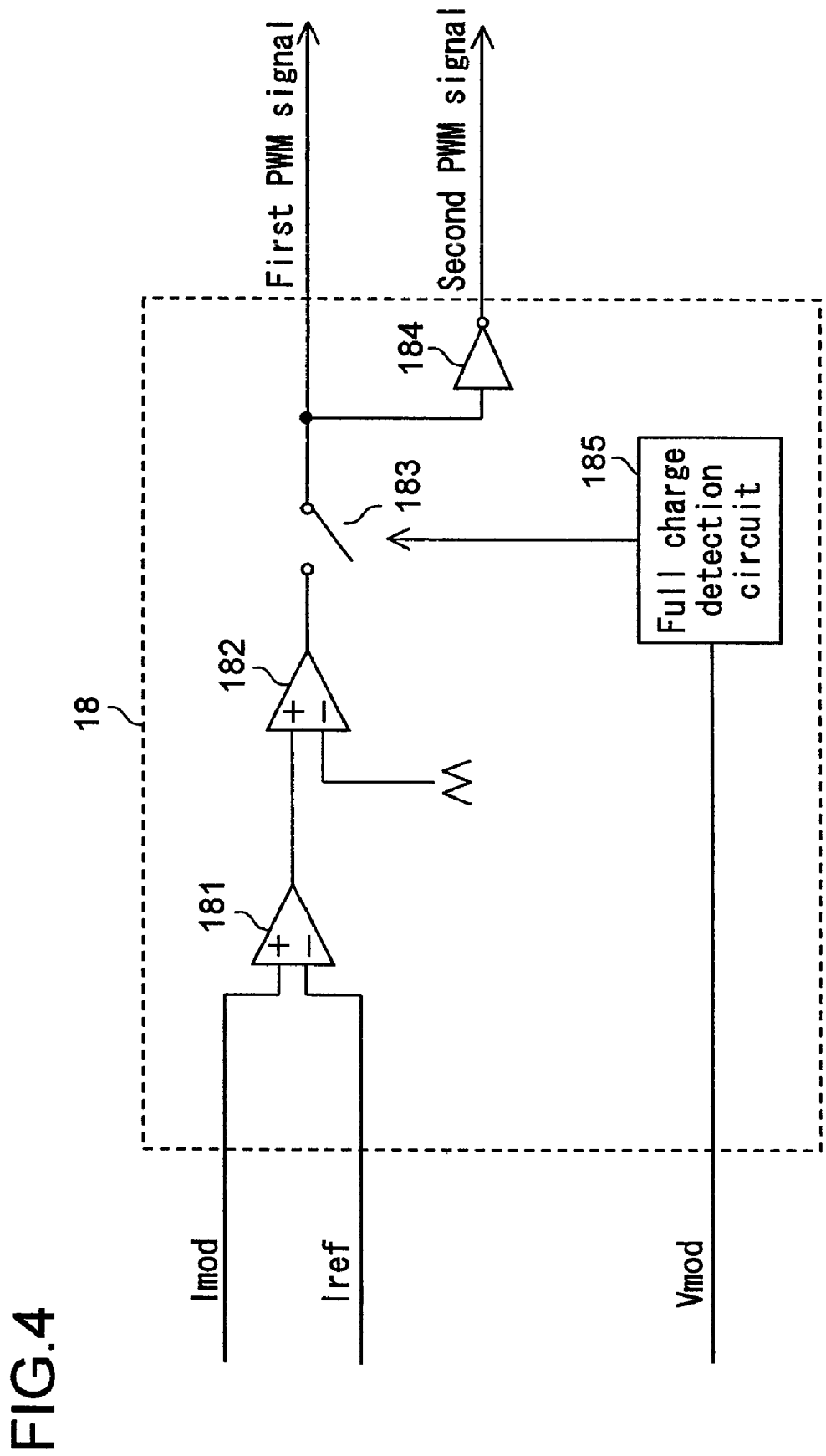
FIG. 4 is a diagram showing an electric configuration of a charge control circuit in FIG. 2.

FIG. 4: Details of Charge Control Circuit

FIG. 4 shows the detailed electric configuration of the charge control circuit 18 in FIG. 2. As described above, the module current Imod detected by the current detection circuit 16 and the charge current instruction Iref from the outside are supplied to a current control circuit 181. The current control circuit 181 subtracts the charge current instruction Iref from the module current Imod, thereby generating a current error signal and supplies the current error signal (Imod–Iref) to a PWM control circuit 182.

The PWM control circuit 182 subtracts a predetermined delta wave signal from the current error signal (Imod–Iref), thereby generating the first PWM signal. In a state where a switch 183 is on, the first PWM signal is output to the switching element 132 for discharging of the voltage increase/decrease circuit 13 shown in FIG. 2. The first PWM signal is supplied to an inverter circuit 184. The inverter circuit 184 inverts the polarity of the first PWM signal, thereby generating the second PWM signal. In a state where the switch 183 is on, the second PWM signal is output to the switching element 133 for charging.

The module voltage Vmod detected by the first voltage detection circuit 14 is supplied to a full charge detection circuit 185. The full charge detection circuit 185 detects a full charge state of the power supply module 10 on the basis of the module voltage Vmod. When the full charge state is detected, the switch 183 is switched to off, and the supply of the PWM signal to the switching element 132 for discharging and the switching element 133 for charging of the voltage increase/decrease circuit 13 shown in FIG. 2 is stopped.

In the power supply system 1 of the embodiment, as stated above, by making the powers generated across the power supply modules 10 coincide between two power supply units connected to each other (for example, between the power supply units U1 and U2) at the time of discharging and regenerate charging, the powers generated across the power supply modules of all of the power supply units can be equalized.

Therefore, when the capacities of all of the power supply modules 10 are the same (when all of the power supply modules are charged so as to be able to output the same power) on start of driving of the power supply system 1, at the time of discharging, the residual quantities of all of the power supply modules become zero at the same time so that a power supply module having relatively low internal resistance and a power supply module having relatively high output voltage (corresponding to the module voltage Vmod) can be prevented from being over-discharged. At the time of regenerate charging, all of the power supply modules are fully charged at the same time point so that a power supply module having relatively low internal resistance and a power supply module having relatively low output voltage can be prevented from being over-charged.

The power supply system 1 of the embodiment can be used as a source for supplying power to various loads having different rated voltages by changing the target output voltage Vref. In particular, when the load is a motor, the voltage which can be applied to the motor can be freely set, so that an adjustment range of the speed of rotation of the motor can be widened.

The power supply system 1 of the embodiment can be also used as a source of supplying power to various loads having different power consumption by increasing/decreasing the number (that is, the number indicated by "n") of power supply units U1 to Un.

In the power supply system 1 of the embodiment, the power supply unit becomes smaller as compared with the configuration having a voltage increasing circuit and a voltage decreasing circuit.

In the power supply system 1 of the embodiment, at the time of normal charging, the charge control is performed by the charge control circuit 18 of each of the power supply units, so that a conventional charger having a charge control circuit is unnecessary.

Charging can be made with a voltage lower than the output voltage Vout of the power supply unit. For example, when the voltage Vmod across the power supply module 10 is 24 V and the rated voltage of the load (corresponding to the output voltage Vout of the powers supply unit) is 48 V, if the output voltage of the charger is a voltage larger than 24 V a little (for example, 30 V), charging can be performed. Conventionally, a voltage (for example, 50 V) larger than the rated voltage of a load is necessary as an output voltage of the charger, so that the power supply system is subjected to various constraints of standards for safety (such as, for example in Japan, Electrical Appliance and Material Safety Law). The power supply system 1 can be free from such constraints.

Further, the power supply system 1 of the embodiment can supply a voltage according to the output voltage of the power supply module 10 across the power supply module 10 at the time of regenerate charging and normal charging.

Second Embodiment

Modification of Charging Method

Figure 5:
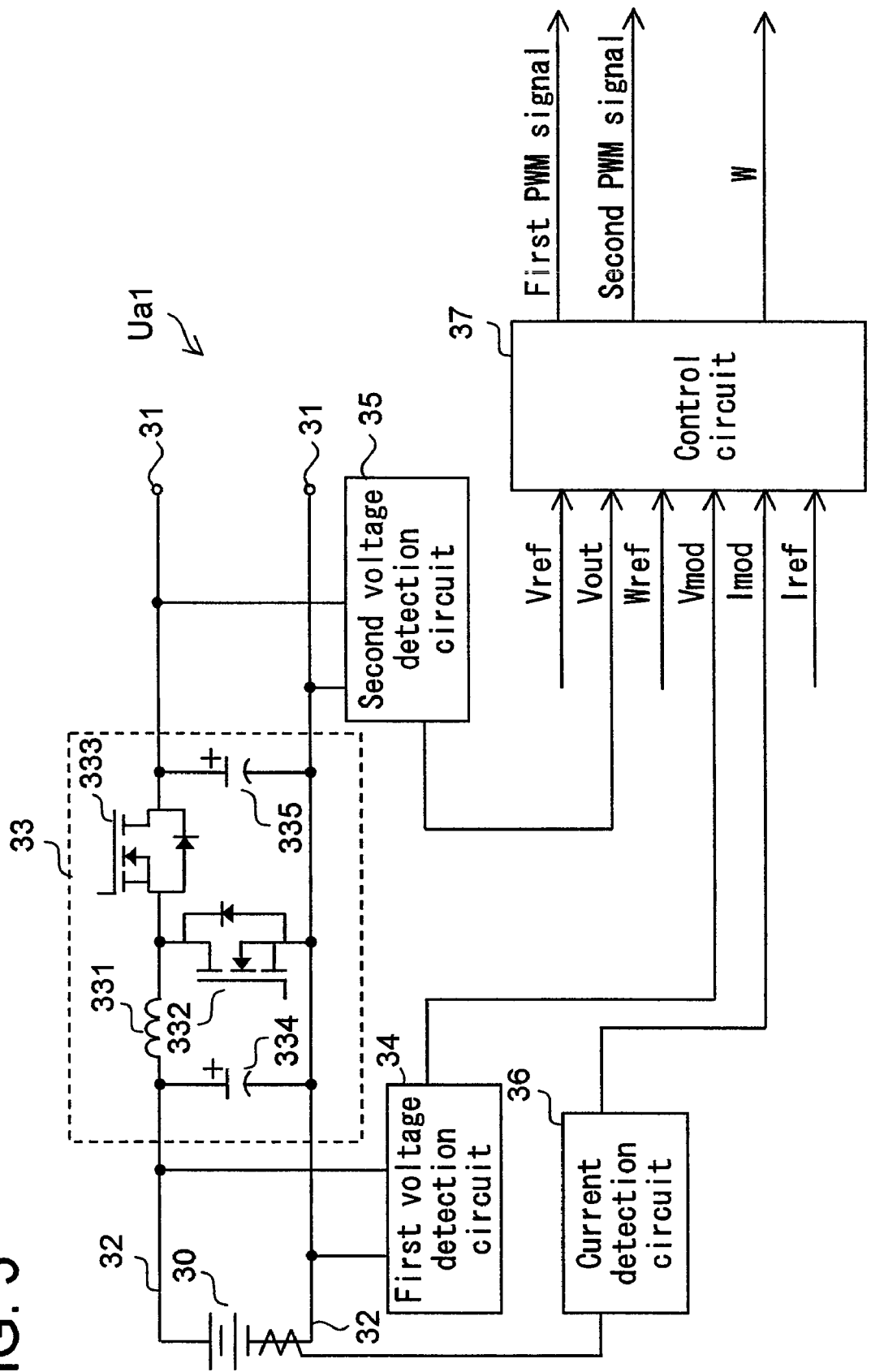
FIG. 5 is a diagram showing an electric configuration of a power supply unit according to a second embodiment of the present invention.

A second embodiment of a power supply unit according to the present invention and a power supply system having the power supply unit will be described below with reference to the drawings. The power supply system of the second embodiment has, like the power supply system 1 of the first embodiment shown in FIG. 1, "n" power supply units Ua1, Ua2, . . . , and Uan which are connected in parallel with one another (only the power supply unit Ua1 is shown in FIG. 5 but the other power supply units Ua2 to Uan are not shown) and a pair of connection terminals (not shown) to which a load such as a motor and a power supply for charging for supplying power to the power supply unit are to be connected. That is, the connection relation of the "n" power supply units Ua1, Ua2, . . . , and Uan is similar to that of the "n" power supply units U1, U2, . . . , and Un of the power supply system 1 in the first embodiment.

FIG. 5: Description of Configuration

FIG. 5 shows the configuration of the power supply unit Ua1 of the second embodiment. Since the configuration of the power supply units Ua2 to Uan other than the power supply unit Ua1 is similar to that of the power supply unit Ua1, its illustration and description are omitted. The power supply unit Ua1 has a pair of input/output terminals 31, 31 connected to the pair of connection terminals (not shown). A power supply module 30 is constructed by either a single secondary cell (storage battery) or a plurality of secondary cells connected in series with one another. The power supply module 30 is similar to the power supply module 10 in the first embodiment.

Two serial lines 32, 32 extend from both ends of the power supply module 30 toward the pair of input/output terminals 31, 31. For the serial lines 32, 32, a voltage increase/decrease circuit 33 is provided. The voltage increase/decrease circuit 33 has the same configuration as that of the voltage increase/decrease circuit 13 of the first embodiment and is constructed by a coil 331, a switching element 332 for discharging, a switching element 333 for charging, a first capacitor 334, and a second capacitor 335. Since the operation of the voltage increase/decrease circuit 33 is the same as that of the voltage increase/decrease circuit 13 of the first embodiment, the description will not be repeated.

To the two serial lines 32, 32, a first voltage detection circuit 34 for detecting a voltage across the power supply module 30 and also a second voltage detection circuit 35 for detecting an output voltage of the voltage increase/decrease circuit 33 are connected. Further, to the two serial lines 32, 32, a current detection circuit 36 for detecting current flowing in the power supply module 30 is connected.

The module voltage Vmod detected by the first voltage detection circuit 34, the output voltage Vout detected by the second voltage detection circuit 35, and the module current Imod detected by the current detection circuit 36 are input to a control circuit 37 built with a microcomputer. The control circuit 37 calculates power generated across the power supply module 30 on the basis of the module voltage Vmod and the module current Imod at the time of discharging and regenerate charging, and outputs the power calculation result W to one of the power supply units connected.

To the control circuit 37, the voltage instruction Vref indicative of a target output voltage of the voltage increase/ decrease circuit 33 is input from the outside and the power calculation result is input as the power instruction Wref from the other power supply unit connected.

The control circuit 37 compares the output voltage Vout with the voltage instruction Vref supplied as described above, compares the power calculation result W in the own unit with the power instruction Wref and, on the basis of the results of comparison, generates the first and second PWM signals. The first and second PWM signals generated in such a manner are supplied to the switching element 332 for discharging and the switching element 333 for charging, respectively, of the voltage increase/decrease circuit 33, thereby controlling on/off states of the switching elements 332 and 333.

As described above, the control is performed to make the output voltage Vout of the voltage increase/decrease circuit 33 follow the target output voltage Vref to set the output voltage Vout of the voltage increase/decrease circuit 33 to the target output voltage Vref, and the control is performed to make the power generated across the power supply module 30 coincide with the power generated across the power supply module of one of the power supply units connected, thereby equalizing the powers generated across the power supply modules of the two power supply units connected to each other.

To the control circuit 37, a charge current instruction Iref indicative of target input current is input from the outside.

At the time of charging, the control circuit 37 compares the supplied module current Imod with the charge current instruction Iref and, on the basis of the result of comparison, generates the first and second PWM signals. The first and second PWM signals generated as described above are supplied to the switching element 332 for discharging and the switching element 333 for charging, respectively, of the voltage increase/decrease circuit 33 and the switching elements 332 and 333 are on/off controlled. In such a manner, the control of making the module current Imod flowing in the power supply module 30 follow the charge current instruction Iref is performed so that the module current Imod is set to the target input current Iref. That is, the control circuit 37 also has the function of a charge control portion for generating and outputting the control signals (first and second PWM signals) to the voltage increase/decrease circuit 33 at the time of normal charging.

The control circuit 37 detects the full charge state of the power supply module 30 on the basis of the module voltage Vmod supplied as described above and, on detection of the full charge state, stops supply of the PWM signals to the switching element 332 for discharging and the switching element 333 for charging. As a result, supply of power from the power supply for charging to the power supply module 30 is stopped.

Figure 6:
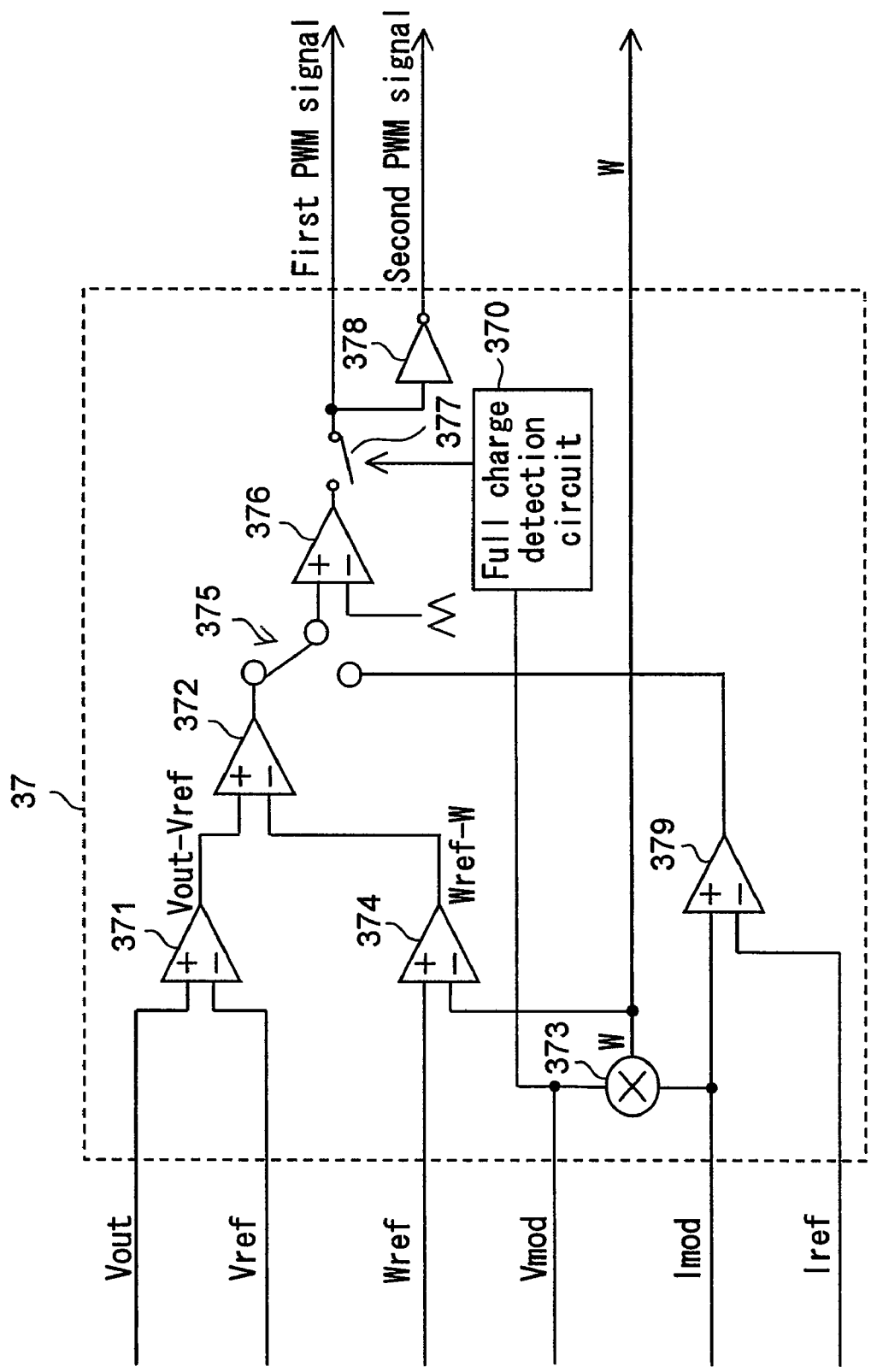
FIG. 6 is a diagram showing an electric configuration of a control circuit in FIG. 5.

FIG. 6: Details of Control Circuit

FIG. 6 shows the detailed electric configuration of the control circuit 37 in FIG. 5. As described above, the output voltage Vout detected by the second voltage detection circuit 35 and the voltage instruction Vref from the outside are supplied to a voltage control circuit 371. In the voltage control circuit 371, the voltage instruction Vref is subtracted from the output voltage Vout, thereby generating a voltage error signal. The voltage error signal (Vout−Vref) is supplied to an error amplification circuit 372.

The module voltage Vmod detected by the first voltage detection circuit 34 is supplied to a power calculation circuit 373 and also to a full charge detection circuit 370. The module current Imod detected by the current detection circuit 36 is supplied to the power calculation circuit 373 and also to a current control circuit 379.

The power calculation circuit 373 multiplies the module voltage Vmod with the module current Imod to thereby calculate the power generated across the power supply module Ua1. The power calculation result W is supplied to a power control circuit 374 and is also output to one of the power supply units connected.

The power instruction Wref is supplied from the other connected power supply unit to the power control circuit 374. The power calculation result W is subtracted from the power instruction Wref, thereby generating a power error signal. The power error signal (Wref−W) is supplied to the error amplification circuit 372.

In the error amplification circuit 372, the power error signal (Wref−W) is subtracted from the supplied voltage error signal (Vout−Vref), thereby generating an error amplification signal. A first switch 375 is switched to the error amplification circuit 372 side at the time of discharging and regenerate charging, and the error amplification signal is supplied to a PWM control circuit 376 via the first switch 375. The PWM control circuit 376 subtracts a predetermined delta wave signal from the error amplification signal, thereby generating the first PWM signal. In the state where a second switch 377 is on, the first PWM signal is output to the switching element 332 for discharging of the voltage increase/decrease circuit 33 shown in FIG. 5. The first PWM signal is also supplied to an inverter circuit 378. The inverter circuit 378 inverts the polarity of the first PWM signal to generate the second PWM signal. In a state where the second switch 377 is on, the second PWM signal is output to the switching element 333 for charging.

That is, the error amplification circuit 372, PWM control circuit 375, and inverter circuit 376 generate and output the first and second PWM signals as control signals to the voltage increase/decrease circuit 33 on the basis of the output voltage Vout, the voltage instruction Vref indicative of the target output voltage of the voltage increase/decrease circuit 33, the power calculation result W of the power calculation circuit 373, and the power instruction Wref obtained from the outside.

The charge current instruction Iref from the outside is supplied to the current control circuit 379. The control circuit 379 subtracts the charge current instruction Iref from the module current Imod supplied as described above, thereby generating a current error signal. The first switch 375 is switched to the current control circuit 379 side at the time of normal charging, and the current error signal (Imod−Iref) is supplied to the PWM control circuit 376 via the first switch 375. The PWM control circuit 376 subtracts a predetermined delta wave signal from the current error signal, thereby generating the first PWM signal. In a state where the second switch 377 is on, the first PWM signal is output to the switching element 332 for discharging of the voltage increase/decrease circuit 33 shown in FIG. 5. The first PWM signal is supplied to the inverter circuit 378. The inverter circuit 378 inverts the first PWM signal, thereby generating the second PWM signal. In a state where the second switch 377 is on, the PWM signal is output to the switching element 333 for charging.

The full charge detection circuit 370 detects a full charge state of the power supply module 30 on the basis of the module voltage Vmod supplied as described above. When the full charge state is detected, the second switch 377 is switched to off, and the supply of the PWM signal to the switching element 332 for discharging and the switching element 333 for charging of the voltage increase/decrease circuit 33 is stopped.

In the power supply system of the embodiment, as stated above, by making the powers generated across the power supply modules 30 coincide with each other between two power supply units connected to each other (for example, between the power supply units Ua1 and Ua2) at the time of discharging and regenerate charging, the powers generated across the power supply modules of all of the power supply units can be equalized.

Therefore, when the capacities of all of the power supply modules 30 are the same (when all of the power supply modules are charged so as to be able to output the same power) on start of driving of the power supply system of the embodiment, at the time of discharging, the residual quantities of all of the power supply modules become zero at the same time so that a power supply module having relatively low internal resistance and a power supply module having relatively high output voltage can be prevented from being over-discharged. At the time of regenerate charging, all of the power supply modules are fully charged at the same time point so that a power supply module having relatively low internal resistance and a power supply module having relatively low output voltage can be prevented from being over-charged.

The power supply system of the embodiment can be used as a source for supplying power to various loads having different rated voltages by changing the target output voltage Vref. In particular, when the load is a motor, the voltage which can be applied to the motor can be freely set, so that an adjustment range of the speed of rotation of the motor can be widened.

The power supply system of the embodiment can be also used as a source of supplying power to various loads having different power consumption by increasing/decreasing the number (that is, the number indicated by "n") of power supply units Ua1 to Uan.

In the power supply system of the embodiment, at the time of normal charging, the charge control is performed by the charge control circuit 37 of each of the power supply units, so that a conventional charger having a charge control circuit is unnecessary.

Further, in the power supply system of the embodiment, as compared with the configuration where a control circuit for performing discharge/regenerate charge control and a control circuit for performing normal charge control are provided, the power supply unit is smaller.

Charging can be made with a voltage lower than the output voltage Vout of the power supply unit. For example, when the output voltage of the power supply module 30 is 24 V and the rated voltage of the load (corresponding to the output voltage Vout of the powers supply unit) is 48 V, if the output voltage of the charger is a voltage larger than 24 V a little (for example, 30 V), charging can be performed. Conventionally, a voltage (for example, 50 V) larger than the rated voltage of a load is necessary as an output voltage of the charger, so that the power supply system is subjected to various constraints of standards for safety (such as, for example in Japan, Electrical Appliance and Material Safety Law). The power supply system of the embodiment can be free from such constraints.

Third Embodiment

Capacitor

Figure 7:
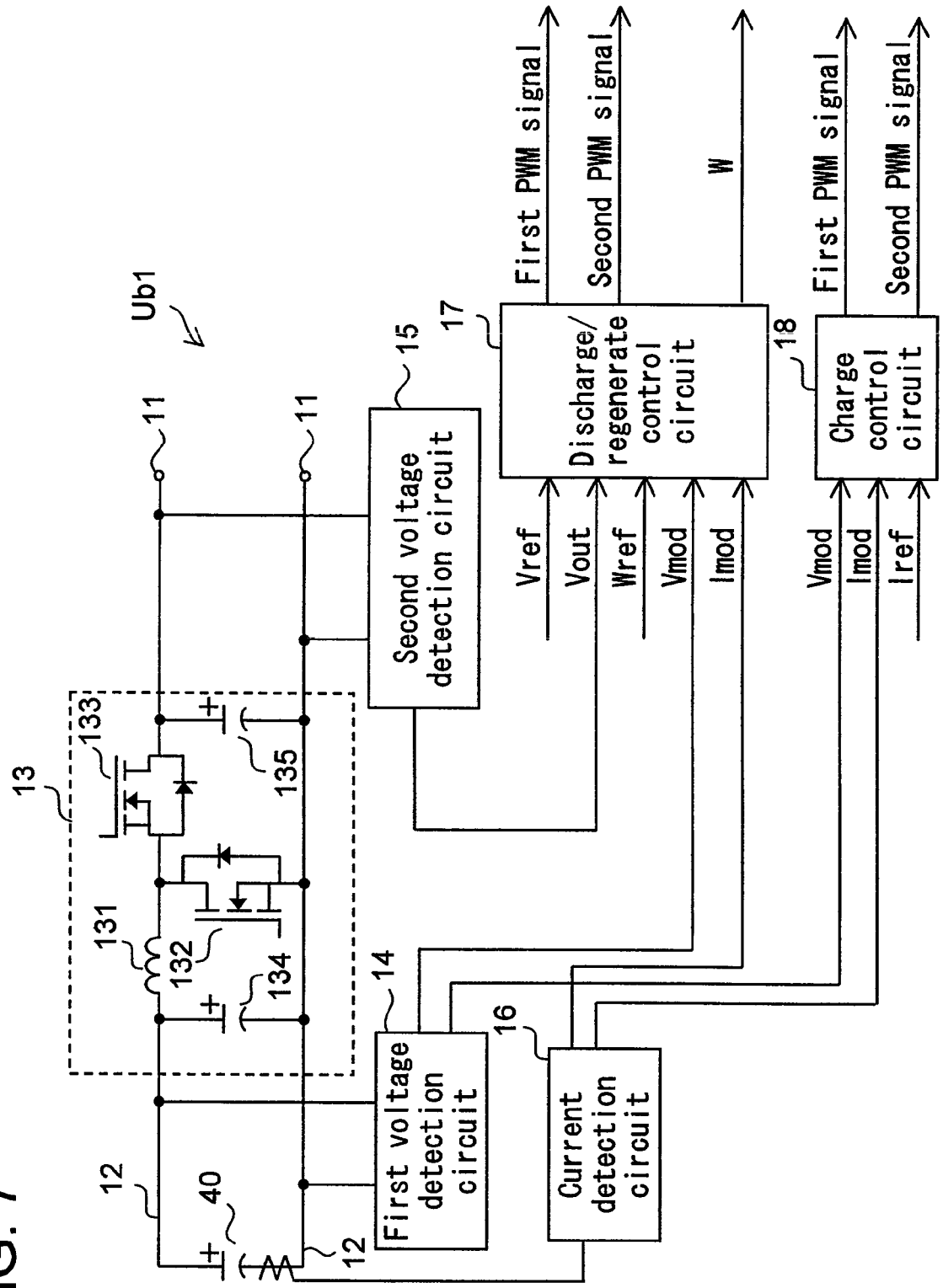
FIG. 7 is a diagram showing an electric configuration of a power supply unit according to a third embodiment of the present invention.

A third embodiment of a power supply unit according to the present invention and a power supply system having the power supply unit will be described below with reference to the drawings. The power supply system of the third embodiment has, like the power supply system 1 of the first embodiment shown in FIG. 1, "n" power supply units Ub1, Ub2, ..., and Ubn which are connected in parallel with one another (only the power supply unit Ub1 is shown in FIG. 7 but the other power supply units Ub2 to Ubn are not shown) and a pair of connection terminals (not shown) to which a load such as a motor and a power supply for charging for supplying power to the power supply unit are to be connected. That is, the connection relation of the "n" power supply units Ub1, Ub2, ..., and Ubn is similar to that of the "n" power supply units U1, U2, ..., and Un of the power supply system 1 in the first embodiment.

FIG. 7: Description of Configuration

FIG. 7 shows the configuration of the power supply unit Ub1 of the third embodiment. Since the configuration of the power supply units Ub2 to Ubn other than the power supply unit Ub1 is similar to that of the power supply unit Ub1, its illustration and description are omitted. In FIG. 7, the same components are given the same reference numerals as those of FIG. 2 and their description will not be repeated. The power supply unit Ub1 in FIG. 7 is similar to the power supply unit U1 in FIG. 2 except that the power supply module 10 in FIG. 2 is replaced with a power supply module 40. The power supply module 40 is not a secondary cell but is constructed by a single capacitor (hereinafter, referred to as a power capacitor) (obviously, the power supply module 40 may be constructed by using a plurality of power capacitors). In the case where the power capacitor has a polarity, it is sufficient to connect the positive pole side to the serial line 12 on the coil 131 side.

For simplicity of description, it is assumed that all of the power supply modules 40 are charged so as to be able to output the same power. Specifically, when the power supply modules 40 start outputting the same power simultaneously, the residual quantities of all of the power supply modules 40 become zero at the same time (the power supply modules 40 simultaneously become unable to output the power).

Discharging, regenerate charging, and normal charging operations similar to those of the first embodiment are performed. Specifically, in a manner similar to the first embodiment, at the time of discharging and regenerate charging, by making the powers generated across the power supply modules 40 coincide with each other between two power supply units connected to each other (for example, between the power supply units Ub1 and Ub2), the powers generated across the power supply modules of all of the power supply units can be equalized.

Therefore, when the capacities of all of the power supply modules 40 are the same (when all of the power supply modules are charged so as to be able to output the same power) on start of driving of the power supply system of the third embodiment, at the time of discharging, the residual quantities of all of the power supply modules become zero at the same time so that a power supply module having relatively low internal resistance and a power supply module having relatively high output voltage (corresponding to the module voltage Vmod) can be prevented from being over-discharged (for example, such a power supply module can be prevented from being unable to output before the other power supply modules). At the time of regenerate charging, all of the power supply modules are fully charged at the same time point so that a power supply module having relatively low internal resistance and a power supply module having relatively low output voltage can be prevented from being over-charged (for example, a voltage across such a power supply module can be prevented from exceeding a predetermined voltage).

As described above, also in the case where the power supply module 40 is constructed by a power capacitor, nothing is changed from the first embodiment for the load and the power supply for charging connected to the pair of connection terminals (not shown in the third embodiment). Therefore, the power supply system of the third embodiment can realize actions and effects similar to those of the power supply system 1 in the first embodiment. Obviously, the third embodiment can be combined with the second embodiment.

Fourth Embodiment

Combination of Secondary Cell and Capacitor

In the first embodiment, the example of constructing the power supply system by the power supply units U1 to Un each having the power supply module 10 which is constructed by a secondary cell has been described. In the third embodiment, the example of constructing the power supply system by the power supply units Ub1 to Ubn each having the power supply module 40 which is constructed by a power capacitor has been described.

In a fourth embodiment of a power supply unit and a power supply system having the power supply unit according to the present invention, a part of the power supply units U1 to Un and a part of the power supply units Ub1 to Ubn mixedly exist (not shown). For example, in FIG. 1, the power supply unit U1 having a secondary cell is replaced with the power supply unit Ub1 having a power capacitor.

Even if such replacement is made, the operation of discharging, regenerate charging, and normal charging in each of the power supply units are the same as those of the first embodiment. Consequently, discharging, regenerative charging, and normal charging operations similar to those of the first embodiment are performed in all of the power supply units. Specifically, in a manner similar to the first embodiment, by making the powers generated across the power supply modules in two power supply units connected to each other (for example, the power supply units Ub1 and U2) coincide with each other at the time of discharging and regenerate charging, the powers generated across the power supply modules of all of the power supply units can be equalized.

Therefore, when the capacities of all of the power supply modules 10 and 40 constructing the power supply system are the same (when all of the power supply modules are charged so as to be able to output the same power) on start of driving of the power supply system of the fourth embodiment, at the time of discharging, the residual quantities of all of the power supply modules become zero at the same time so that a power supply module having relatively low internal resistance and a power supply module having relatively high output voltage (corresponding to the module voltage Vmod) can be prevented from being over-discharged. At the time of regenerate charging, all of the power supply modules are fully charged at the same time point so that a power supply module having relatively low internal resistance and a power supply module having relatively low output voltage can be prevented from being over-charged.

Even when a part of the power supply units U1 to Un and a part of the power supply units Ub1 to Ubn are mixed, nothing is changed from the first embodiment for a load and a power supply for charging connected to the pair of connection terminals (not shown in the fourth embodiment). Therefore, the power supply system of the fourth embodiment can realize actions and effects similar to those of the power supply system 1 in the first embodiment. A power supply system constructed by mixing a part of the power supply units Ua1 to Uan in the second embodiment and a part of the power supply units Ub1 to Ubn in the third embodiment is similar to the above.

Fifth Embodiment

Fuel Cell

Figure 8:
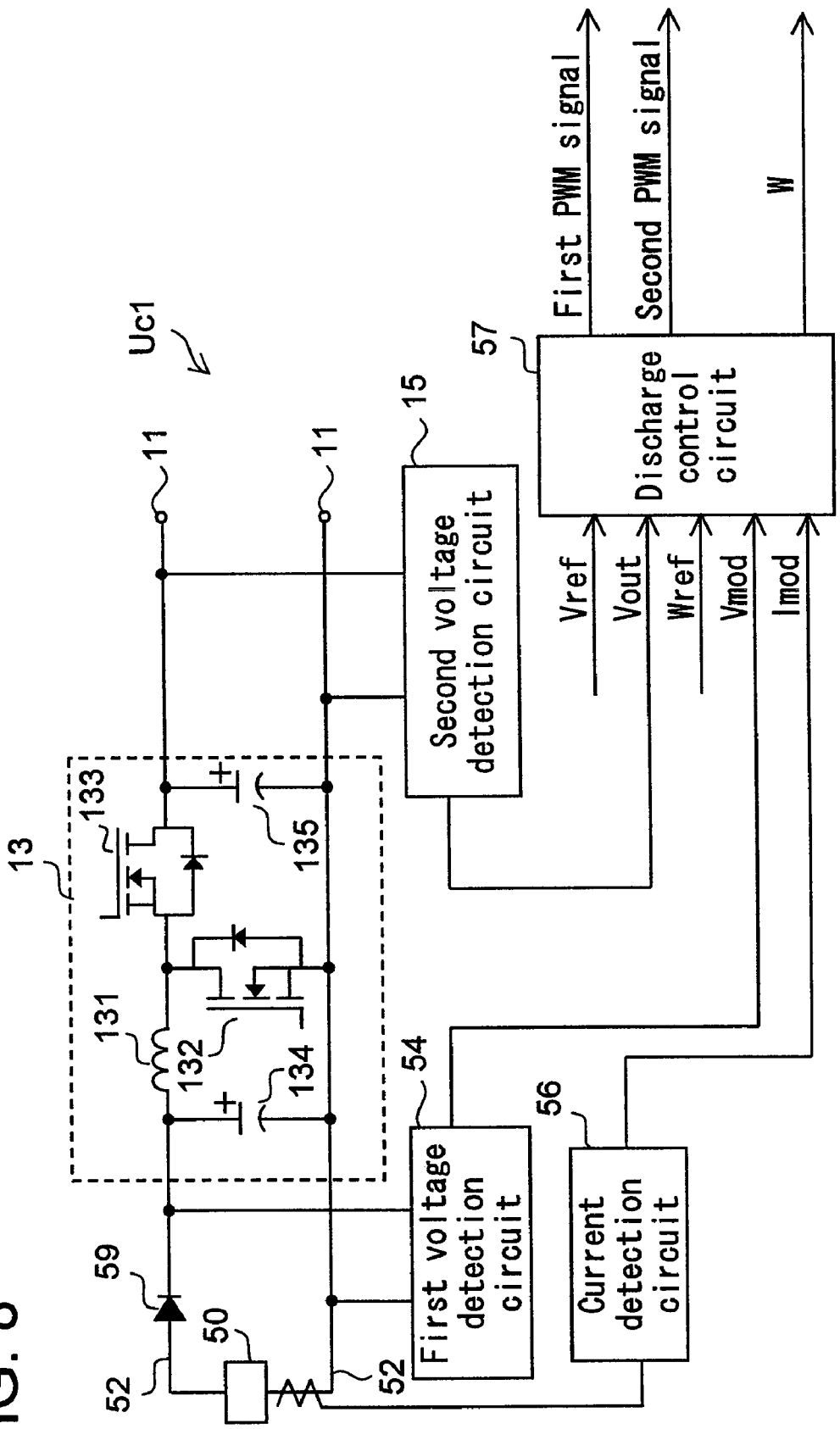
FIG. 8 is a diagram showing an electric configuration of a power supply unit according to a fifth embodiment of the present invention.

A fifth embodiment of a power supply unit according to the present invention and a power supply system having the power supply unit will be described below with reference to the drawings. The power supply system of the fifth embodiment has, like the power supply system 1 of the first embodiment shown in FIG. 1, "n" power supply units Uc1, Uc2, . . . , and Ucn which are connected in parallel with one another (the power supply unit Uc1 is shown in FIG. 8 but the other power supply units Uc2 to Ucn are not shown) and a pair of connection terminals (not shown) to which a load such as a motor is to be connected. That is, the connection relation of the "n" power supply units Uc1, Uc2, . . . , and Ucn is similar to that of the "n" power supply units U1, U2, . . . , and Un of the power supply system 1 in the first embodiment.

FIG. 8: Description of Configuration

FIG. 8 shows the configuration of the power supply unit Uc1 of the fifth embodiment. Since the configuration of the power supply units Uc2 to Ucn other than the power supply unit Uc1 is similar to that of the power supply unit Uc1, its illustration and description are omitted. In FIG. 8, the same components are given the same reference numerals as those of FIG. 2 and their description will not be repeated. The particular points different from the first embodiment will be described below.

Figure 9:
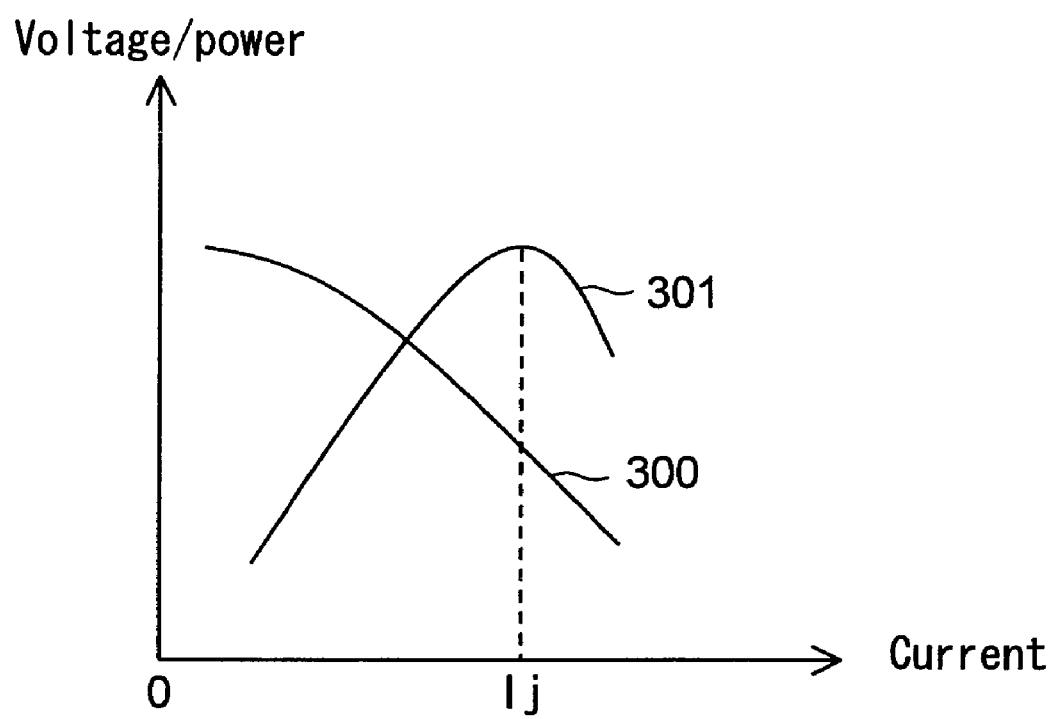
FIG. 9 is a diagram showing output characteristics of a fuel cell applied to the prior art and the present invention.

A power supply module 50 is constructed by a fuel cell (not shown) and outputs power generated by the fuel cell to a load (not shown) connected to the input/output terminals 11, 11 via two serial lines 52, 52. The power supply module 50 has therein parts (a pump and the like for supplying hydrogen as the fuel of the fuel cell, which are not shown) enabling the fuel cell to output power. It is assumed that all of rated output capacities of fuel cells in the power supply units Uc1 to Ucn are the same and the output characteristic of each of the fuel cells is similar to that shown in FIG. 9.

A point that the coil 131 as an inductor and the switching element 133 for charging constructed by an MOSFET and a diode whose power supply module 50 side is an anode are provided for one of the two serial lines 52, 52 is similar to the serial lines 12 (FIG. 2). For one of the serial lines 52, 52, a diode 59 is further provided. More specifically, the positive voltage output side of the power supply module 50 is connected to the anode of the diode 59, and the cathode of the diode 59 is connected to the positive electrode of the second capacitor 134 and one end of the coil 131.

To the two serial lines 52, 52, a first voltage detection circuit 54 for detecting a voltage across the power supply module 50 is connected, and the second voltage detection circuit 15 for detecting the output voltage of the voltage increase/decrease circuit 13 is connected. Further, to the two serial lines 52, 52, a current detection circuit 56 for detecting current flowing in the power supply module 50 is connected.

The module voltage Vmod detected by the first voltage detection circuit 54, the output voltage Vout detected by the second voltage detection circuit 15, and the module current Imod detected by the current detection circuit 56 are input to a discharge control circuit 57 built with a microcomputer. The discharge control circuit 57 calculates power generated across the power supply module 50 on the basis of the module voltage Vmod as a result of detection by the first voltage detection circuit 54 and the module current Imod as a result of detection of the current detection circuit 56 at the time of discharging, and outputs the power calculation result W to the power supply unit Ucn as one of the power supply units connected as described above.

The operation of the discharge control circuit 57 is similar to that of the discharge/regenerate control circuit 17 in the first embodiment so that more detailed description of the operation of the discharge control circuit 57 will not be repeated.

The discharging operation of the power supply system of the fifth embodiment is similar to that of the first embodiment. That is, in a manner similar to the first embodiment, by making the powers generated across the power supply modules 50 in two power supply units connected to each other (for example, the power supply units Uc1 and Uc2) coincide with each other at the time of discharging, the powers generated across the power supply modules of all of the power supply units can be equalized.

Therefore, even if the output impedances of the fuel cells in the power supply modules 50 are various, the powers generated across the power supply modules 50 are equalized, and the risk of destruction of the fuel cells is extremely reduced.

In the power supply system of the embodiment, by changing the target output voltage Vref, the power supply system of the embodiment can be used as a power supply source for various loads having different rated voltages. Particularly, when the load is a motor, a voltage which can be applied to the motor can be freely set, so that the adjustment range of the motor rotational speed can be enlarged.

The power supply system of the embodiment can be used as a power supply source of various loads having different power consumption by increasing/decreasing the number (that is, the number indicated by "n") of power supply units Uc1 to Ucn.

Even if a load tries to make the power regenerate to the power supply unit Uc1 side, the power is prevented from flowing in the power supply module 50 by the diode 59. In the case where the load is not a load having the nature of regenerating the power to the power supply unit Uc1 side, the diode 59 can be omitted (the diode 59 can be short-circuited).

Variations and Modifications

Each of the configurations of the present invention is not limited to the foregoing embodiments but can be variously modified within the technical range described in the scope of the claims.

For example, the on/off control of the switching element for discharging and the switching element for charging can be realized not only by software (such as the discharge/regenerate control circuit 17 or the charge control circuit 18, which are built with a microcomputer) but also hardware. The present invention is not limited to the voltage increase/decrease circuits 13 and 33 shown in FIGS. 2 and 5 but can employ various known voltage increase/decrease circuits.

Mixture of Different Specifications

In the first and second embodiments, a plurality of power supply modules having the same capacity are used. It has been described that the power supply modules are charged so as to be able to output the same power on start of the driving of the power supply system. Alternatively, in the same power supply system, power supply modules may be constructed by employing secondary cells having quite different characteristics of the rated capacity and the like.

In this case, it is sufficient to modify the configuration of the embodiments as follows. For example, in the first embodiment, when the rated capacity of the power supply module 10 of the power supply unit U1 is twice as large as that of the power supply module 10 of the power supply unit U2 and the rated capacities of the power supply modules 10 of the power supply units U2 to Un are the same, in the power supply unit U1, it is sufficient for the power calculation circuit 173 to supply, as the power calculation result W, a value obtained by multiplying the product of the module voltage Vmod and the module current Imod with "½" as a computing factor to the power control circuit 174 and the power supply unit Un connected (hereinafter, the control of multiplying such a computing factor will be referred to as "computing factor adding control").

In such a manner, the control of setting the power generated across the power supply module 10 of the power supply unit U1 to a value which is twice as large as the power of the power supply unit U2 can be realized. At the time of discharging, the residual quantities of all of the power supply modules become zero, and occurrence of a situation that a part of the power supply modules is over-discharged can be prevented. At the time of regenerate charging, all of the power supply modules are fully charged at the same time, and occurrence of a situation that a part of the power supply modules are over-charged can be prevented.

When a power supply module is constructed by a single secondary cell, the rated capacity of the power supply module 10 is equal to the rated capacity of the secondary cell. When a corresponding power supply module is constructed by a plurality of secondary cells, the rated capacity of the power supply module 10 is equal to a combined rated capacity of the plurality of secondary cells.

The "computing factor adding control" can be also similarly applied to the third to fifth embodiments and it is sufficient to set the computing factor in accordance with the electrostatic capacity of the power capacitor constructing the power supply module and the rated output capacity of the fuel cell.

Current Balance Control

In each of the power supply units of the first to fifth embodiments, the control of making the power of the power supply module coincide with the power of the power supply module of the connected other power supply unit is performed. Another configuration may be employed such that when variations of the output voltages of the power supply modules are small, a control of making the currents flowing in the power supply modules coincide with each other (hereinafter, referred to as "current balance control") is performed.

The above will be described by using FIG. 3 in the first embodiment. In the power supply unit U1, the power calculation circuit 173 supplies a signal corresponding to the module current Imod in place of the power calculation result W to the power control circuit 174 and the connected power supply unit Un. Further, the power control circuit 174 of the power supply unit U1 receives a signal corresponding to the module current Imod of the power supply unit U2 supplied from the power supply unit U2 in place of the power instruction Wref, and gives, in place of the power error signal Wref–W), a current error signal obtained by subtracting the signal corresponding to the module current Imod of the power supply unit U1 from the signal corresponding to the module current Imod of the power supply unit U2 to the error amplification circuit 172.

In such a manner, the control of making the module current Imod of the power supply unit U1 coincide with the module current Imod of the power supply unit U2 as one of the power supply units connected is performed, thereby equalizing the module currents Imod of the two power supply units U1 and U2 connected to each other. As a result, the module currents Imod of all of the power supply units U1 to Un are equalized. Therefore, in the case where variations of the output voltages of the power supply modules are small, the powers obtained from the power supply modules become almost equal to each other, so that the above-described various effects can be obtained.

Power Fixing Control

For example, only the power control circuit 174 (see FIG. 3) of the power supply unit U1 among the power supply units U1 to Un in the first embodiment may subtract the power calculation result W output from the power calculation circuit 173 from a fixed power value Wfix. Specifically, the power control circuit 174 of the power supply unit U1 may output a power error signal (Wfix−W) in place of the power error signal (Wref−W). Herewith, the powers generated across the power supply modules 10 of all of the power supply units U1 to Un can be equalized with the predetermined power value Wfix at the time of discharging and regenerate charging. The fixed power value Wfix may be preset in the control circuit 17 or given from the outside.

Such "a method of equalizing powers generated across all of the power supply modules in the same power supply system with the fixed power value Wfix" can be also applied to the second to fifth embodiments. Particularly, in the case of applying the method to the fifth embodiment, by properly setting the power value Wfix, destruction of a fuel cell which occurs when the fuel cell in the power supply module 50 is over-discharged can be prevented with reliability.

The method of equalizing the powers generated across all of the power supply modules with the fixed power value Wfix can be also combined with the "current balance control". Specifically, currents flowing in all of the power supply modules in the same power supply system may be equalized with a fixed current value Ifix.

What is claimed is:

1. A power supply unit having a pair of input/output terminals to/from which power is to be input/output, and a power supply module to/from which power can be input/output, the power supply unit being connected to an external unit comprising at least one other power supply unit, the power supply unit comprising:
a current detection circuit for detecting current flowing in the power supply module;
a voltage adjustment circuit for increasing the voltage across the power supply module and outputting the increased voltage to the pair of input/output terminals or for decreasing the voltage between the pair of input/output terminals and outputting the decreased voltage across the power supply module; and
a control circuit for controlling operation of the voltage adjustment circuit, wherein the control circuit includes:
an output portion for outputting a current detection result of the current detection circuit as a first current detection result to the external unit; and
a control portion for generating a control signal on the basis of a target output voltage of the voltage adjustment circuit, the first current detection result, and a second current detection result obtained from the external unit, and for outputting the control signal to the voltage adjustment circuit.

2. The power supply unit according to claim 1, wherein the power supply module is constructed by a storage battery or a capacitor.

3. A power supply unit having a pair of input/output terminals from which power is to be output, and a power supply module from which power can be output, the power supply unit being connected to an external unit comprising at least one other power supply unit, the power supply unit comprising:
a current detection circuit for detecting current flowing in the power supply module;
a voltage adjustment circuit for increasing the voltage across the power supply module and outputting the increased voltage to the pair of input/output terminals; and
a control circuit for controlling operation of the voltage adjustment circuit, wherein the control circuit includes:
an output portion for outputting a current detection result of the current detection circuit as a first current detection result to the external unit; and
a control portion for generating a control signal on the basis of a target output voltage of the voltage adjustment circuit, the first current detection result, and a second current detection result obtained from the external unit, and for outputting the control signal to the voltage adjustment circuit.

4. The power supply unit according to claim 3, wherein the power supply module is constructed by a storage battery, a capacitor or a fuel cell.

5. A power supply system having a pair of connection terminals to which a load is to be connected, and having a plurality of power supply units connected in parallel with one another with respect to the pair of connection terminals, each of the power supply units comprising a power supply module capable of outputting power, each of the power supply units comprising:
a current detection circuit for detecting current flowing in the power supply module of the power supply unit itself;
a voltage adjustment circuit for increasing the voltage across the power supply module of the power supply unit itself and outputting the increased voltage to the pair of connection terminals; and
a control circuit for controlling operation of the voltage adjustment circuit,
the control circuits of all of the power supply units being connected to each other, wherein
in each power supply unit, the control circuit includes:
an output portion for outputting a current detection result of the current detection circuit in the power supply unit as a first current detection result to a connected control circuit; and
a control portion for generating a control signal on the basis of a target output voltage of the voltage adjustment circuit in the power supply unit, the first current detection result, and a second current detection result obtained from the connected control circuit or another connected control circuit, and for outputting the control signal to the voltage adjustment circuit in the power supply unit.

6. The power supply system according to claim 5, wherein each of the power supply modules can also receive power and, in each of the power supply units, the voltage adjustment circuit decreases voltage between the pair of connection terminals and outputs the decreased voltage across the power supply module of the power supply unit.

7. The power supply system according to claim 6, wherein each power supply unit has a pair of power input/output terminals connected to the pair of connection terminals, the voltage adjustment circuit includes:
an inductor provided for one of two serial lines extending from both ends of a power supply module to the pair of power input/output terminals;

a switching element for charging provided on the power input/output terminal side of the inductor of the one serial line and having a rectifier for setting a current direction at the time of discharging of the power supply module to a forward direction; and a switching element for discharging provided for parallel lines for connecting the two serial lines to each other between the inductor and the switching element for charging and having a rectifier for setting the current direction at the time of charging the power supply module to a forward direction, and the control portion of the control circuit generates a control signal for the switching element for charging and a control signal for the switching element for discharging.

8. The power supply system according to claim 6, wherein a charging power supply for supplying power to power supply modules of the plurality of power supply units can be connected to the pair of connection terminals, and each power supply unit has a charging control portion for generating and outputting a control signal to the voltage adjustment circuit in the power supply unit itself on the basis of target input current of the power supply module of the power supply unit itself and a detection result of the current detection circuit of the power supply unit itself when the charging power supply is connected to the pair of connection terminals.

9. The power supply system according to claim 6, wherein a charging power supply for supplying power to power supply modules of the plurality of power supply units can be connected to the pair of connection terminals, and the control circuit of each power supply unit has a charging control portion for generating and outputting a control signal to the voltage adjustment circuit in the power supply unit on the basis of target input current of the power supply module in the power supply unit and a detection result of the current detection circuit of the power supply unit when the charging power supply is connected to the pair of connection terminals.

10. The power supply system according to claim 5, wherein the power supply module is constructed by a storage battery, a capacitor, or a fuel cell.

* * * * *